United States Patent
Hagshenas et al.

(10) Patent No.: US 6,896,480 B1
(45) Date of Patent: May 24, 2005

(54) LONG TERM STORAGE CAPABLE DAMPING SYSTEM FOR AN EXPENDABLE GAS TURBINE ENGINE

(75) Inventors: Buzz Hagshenas, San Diego, CA (US); Eric Alexander, San Diego, CA (US); Anthony Jones, San Diego, CA (US); Mark Harris, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 10/693,309

(22) Filed: Oct. 24, 2003

Related U.S. Application Data

(63) Continuation-in-part of application No. 10/453,747, filed on Jun. 3, 2003.

(51) Int. Cl.[7] .............................................. F01D 25/04
(52) U.S. Cl. ........................ 415/119; 415/229; 415/231
(58) Field of Search ........................ 415/119, 229, 231; 416/500; 277/554, 651; 384/518, 517

(56) References Cited

U.S. PATENT DOCUMENTS

| | | |
|---|---|---|
| 3,527,055 A | 9/1970 | Rego |
| 3,678,306 A | 7/1972 | Garnier et al. |
| 3,705,775 A | 12/1972 | Rioux |
| 3,961,199 A | 6/1976 | Bronicki |
| 3,965,673 A | 6/1976 | Friedrich |
| 4,242,865 A | 1/1981 | Harrison et al. |
| 4,308,463 A | 12/1981 | Giras et al. |
| 4,450,361 A | 5/1984 | Holt |
| 4,490,622 A | 12/1984 | Osborn |
| 4,601,591 A * | 7/1986 | Wright ........................ 384/536 |
| 4,743,776 A | 5/1988 | Baehler et al. |
| 4,769,993 A | 9/1988 | Kawamura |
| 5,014,508 A | 5/1991 | Lifka |
| 5,161,806 A * | 11/1992 | Balsells ....................... 277/383 |
| 5,201,798 A | 4/1993 | Hogan |
| 5,237,817 A | 8/1993 | Bornemisza et al. |
| 5,454,222 A | 10/1995 | Dev |
| 5,497,615 A | 3/1996 | Noe et al. |
| 5,555,722 A | 9/1996 | Mehr-Ayin et al. |
| 5,558,502 A | 9/1996 | Fukazawa et al. |
| 5,577,380 A | 11/1996 | Shekleton et al. |
| 5,722,228 A | 3/1998 | Lampe et al. |
| 5,906,096 A | 5/1999 | Siga et al. |
| 5,927,066 A | 7/1999 | Shekleton et al. |

(Continued)

FOREIGN PATENT DOCUMENTS

WO    WO 80/02585    11/1980

*Primary Examiner*—Ninh H. Nguyen
(74) *Attorney, Agent, or Firm*—Carlson, Gaskey & Olds

(57) ABSTRACT

A dampening system for a miniature high-speed turbojet engine provides single or multiple resilient mounting which includes a seal with an at least partially encapsulated spring for forward and aft bearings which mount a rotor shaft. The self-induced first engine order of the rotating rotor shaft is transmitted through the forward and aft bearing and is then absorbed in the resilient mountings. Dependable seal and vibration reduction is thereby provided irrespective of long term storage.

9 Claims, 6 Drawing Sheets

U.S. PATENT DOCUMENTS

| | | |
|---|---|---|
| 5,960,625 A | 10/1999 | Zdvorak, Sr. |
| 5,966,926 A | 10/1999 | Shekleton et al. |
| 6,065,281 A | 5/2000 | Shekleton et al. |
| 6,082,112 A | 7/2000 | Shekleton |
| 6,178,751 B1 | 1/2001 | Shekleton et al. |
| 6,307,278 B1 | 10/2001 | Nims et al. |
| 6,314,717 B1 | 11/2001 | Teets et al. |
| 6,392,313 B1 | 5/2002 | Epstein et al. |
| 6,453,676 B1 | 9/2002 | Ho et al. |
| 6,470,258 B1 | 10/2002 | Leamy et al. |
| 6,498,978 B2 | 12/2002 | Leamy et al. |

* cited by examiner

LONG TERM STORAGE CAPABLE DAMPING SYSTEM FOR AN EXPENDABLE GAS TURBINE ENGINE

The present application is a Continuation-in-Part of, and claims priority to, U.S. patent application Ser. No. 10/453,747, filed Jun. 3, 2003, and entitled DAMPING SYSTEM FOR AN EXPENDABLE GAS TURBINE ENGINE.

BACKGROUND OF THE INVENTION

The present invention relates to a miniature gas turbine engine and, more particularly, to a rotor shaft vibration dampening system which provides dependable sealing and vibration reduction irrespective of long term storage.

Miniature gas turbine or turbojet engines (100 lbf thrust and smaller) are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine. Miniature gas turbine engines are difficult to fabricate economically for general expendable usage in large numbers.

To achieve economically feasible extended range expendable propulsion sources for such applications, it is necessary that the gas turbine engines be manufactured relatively inexpensively yet provide a high degree of reliability and efficiency. One component that greatly affects performance yet is rather complicated to manufacture is the rotating component, such as the rotor system which typically includes a shaft mounted turbine and compressor wheel.

Rotor systems of miniature gas turbine engines typically operate at greater than 100,000 rpm. Such high rotations in the relatively small miniature gas turbine engines may generate high first engine order ($1^{st}$ EO) vibration characteristics that can be damaging to the engine, its vehicle, and/or the payload thereof.

Vibration dampening devices are commonly utilized in relatively large turbomachinery and conventional gas turbine engines. These applications typically operate at relatively lower speeds of below 100,000 rpm.

As the relatively large applications provide minimal packaging restrictions and are not designed to be expendable, relatively complicated and expensive dampening systems are feasible. As such, conventional dampening devices are impractical and cost prohibitive for miniature gas turbine engines. Heretofore, miniature gas turbine engines avoided most vibration damping systems altogether.

Moreover, known dampening devices typically require periodic maintenance to assure reliability. Such maintenance may be difficult and time consuming particularly for vehicles which are required to be stored for unknown periods prior to usage.

Accordingly, it is desirable to provide a reliable, inexpensive, and uncomplicated dampening system for an expendable gas turbine engine in which long term storage is of minimal concern.

SUMMARY OF THE INVENTION

The dampening system according to the present invention for a miniature gas turbine engine provides single or multiple a rotary seal resilient mounting for the forward and aft shaft bearings. Self-induced first engine order vibrations of the rotating rotor shaft are transmitted through the forward and aft bearing's inner race, common balls and outer race and then absorbed in the resilient mountings. Dependable seal and vibration reduction is thereby provided irrespective of long term storage.

The present invention therefore provides a reliable, inexpensive, and uncomplicated dampening system for an expendable gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
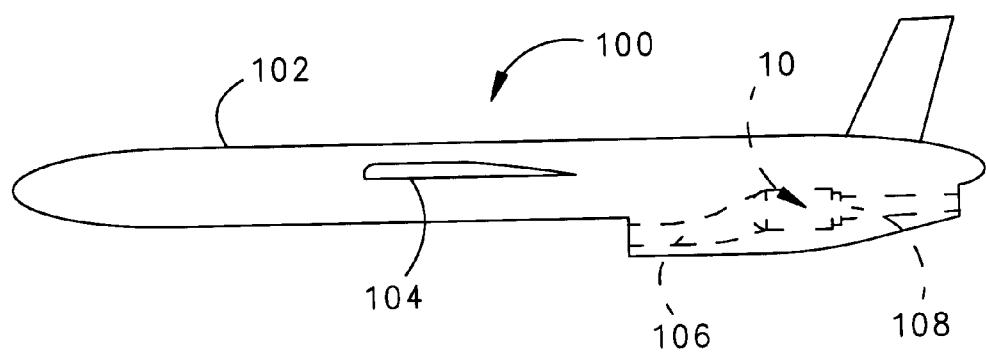
FIG. 1 is a general perspective view an exemplary vehicle embodiment for use with the present invention.

FIG. 1 illustrates a general schematic view of a vehicle 100 including a miniature gas turbine engine 10 according to the present invention. The vehicle 100 includes a body 102 and one or more aerodynamic surfaces 104. The engine 10 is coupled to, or within, the body 102. An intake 106 provides air to the engine 10, and an exhaust pipe 108 exhausts the thrust therefrom. The engine 10 of the invention may also be used in other single usage and reusable applications such as reconnaissance drones, cruise missiles, decoys and other weapon and non-weapon applications.

Figure 2:
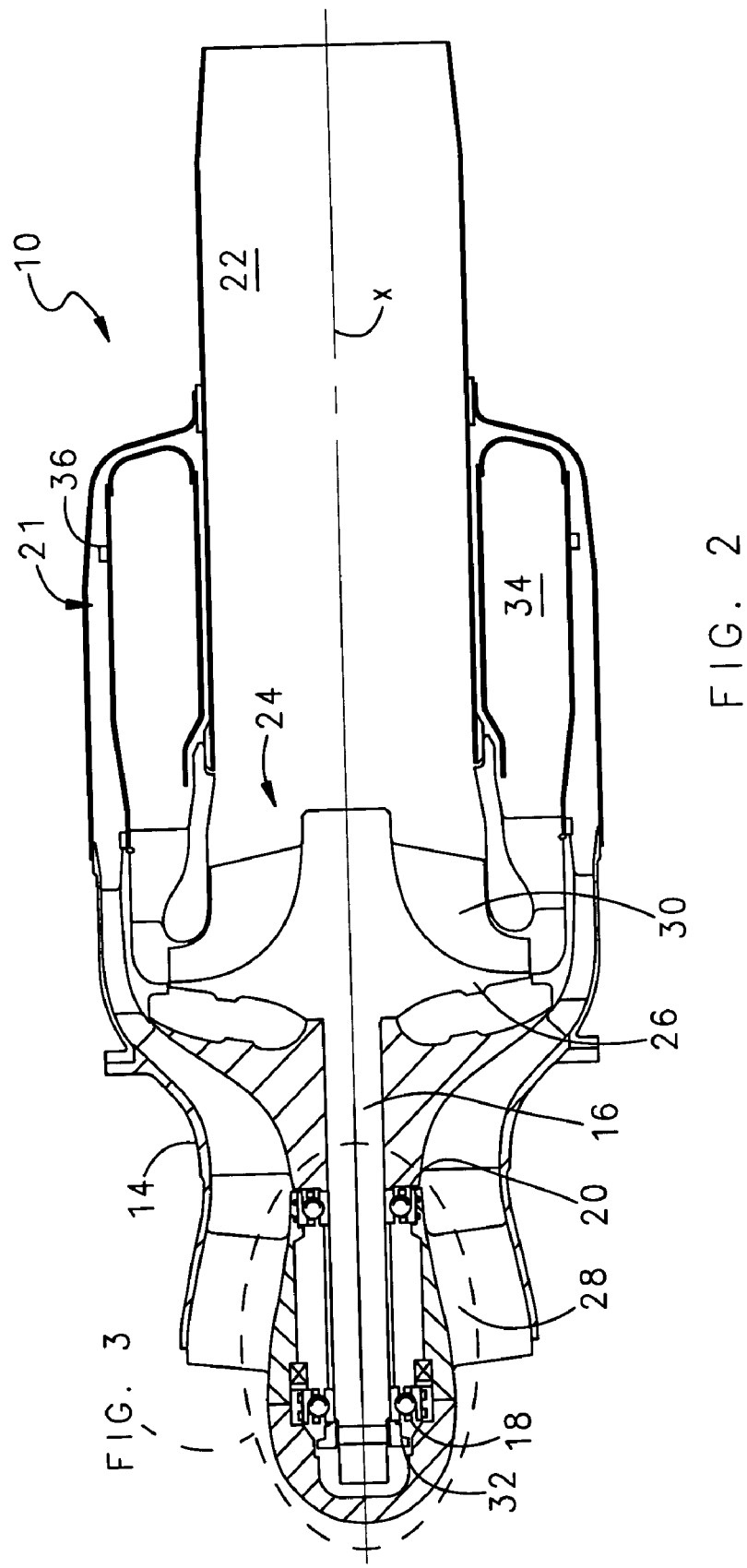
FIG. 2 is a schematic view of a gas turbine engine having a dampening system according to the present invention.

Referring to FIG. 2, the miniature gas turbine engine 10 generally includes a housing 14, a rotor shaft 16 rotationally mounted to a forward bearing 18 and an aft bearing 20, a combustion system 21 and an exhaust pipe (nozzle) 22. The rotor shaft 16 rotates about a longitudinal axis X although other forms of rotors, such as a monorotor configuration, would also benefit from the present invention. In the illustrated rotor configuration, a rotor system 24 includes compressor blades 26 facing forward toward an inlet 28 and turbine blades 30 facing rearward toward the exhaust 22 to define a turbine wheel. The forwardly extending shaft 16 is received in the bearings 18, 20 and is preferably coupled to a fuel pump (illustrated schematically at 32) to provide fuel to an annular combustor liner 34 through a fuel manifold 36.

Figure 3:
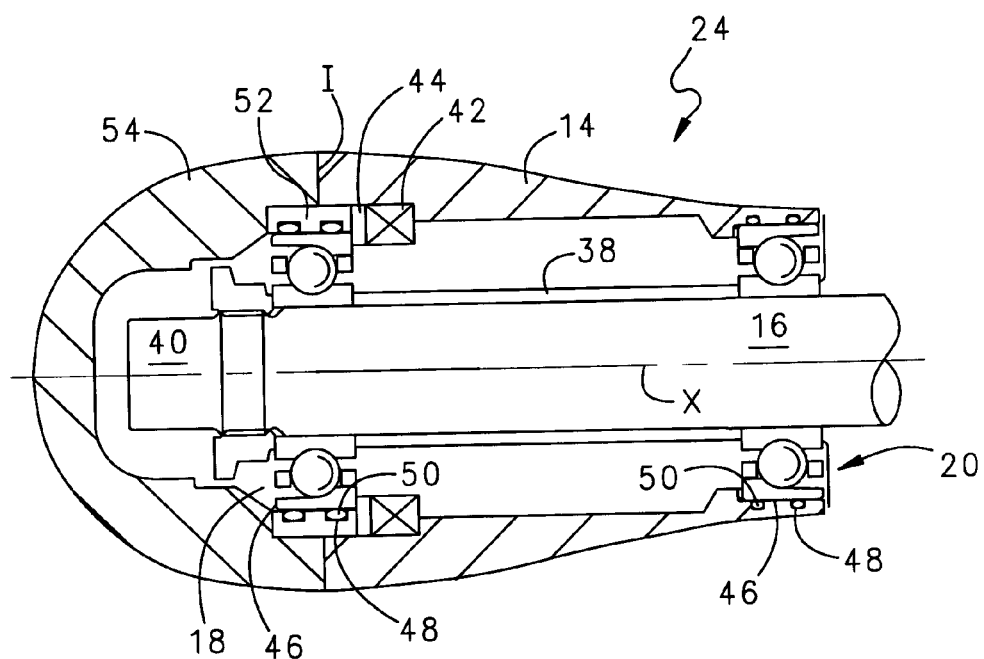
FIG. 3 is an expanded view of the dampening system of FIG. 2.

Referring to FIG. 3, an expanded view of the rotor system 24 is illustrated. The forward bearing 18 and the aft bearing 20 are installed on the shaft 16. The forward bearing 18, and aft bearing 20, are separated by a bearing spacer 38 and are held in place by a rotor nut 40. The forward bearing 18 is pre-loaded with a preload spring 42 and bearing preload spacer 44. It should be understood that although a particular component arrangement is disclosed in the illustrated embodiment, other arrangements will benefit from the instant invention.

The forward and aft bearings 18, 20 are preferably in contact with a dampening system 46 located between each bearing 18,20 and the housing 14 or other static structure. That is, the bearings 18, 20 are closely mounted within a bore 49 in the housing 14 but are supported upon the dampening system 46. It should be understood that other bearing mounting static structure will also benefit from the present invention.

Figure 4:
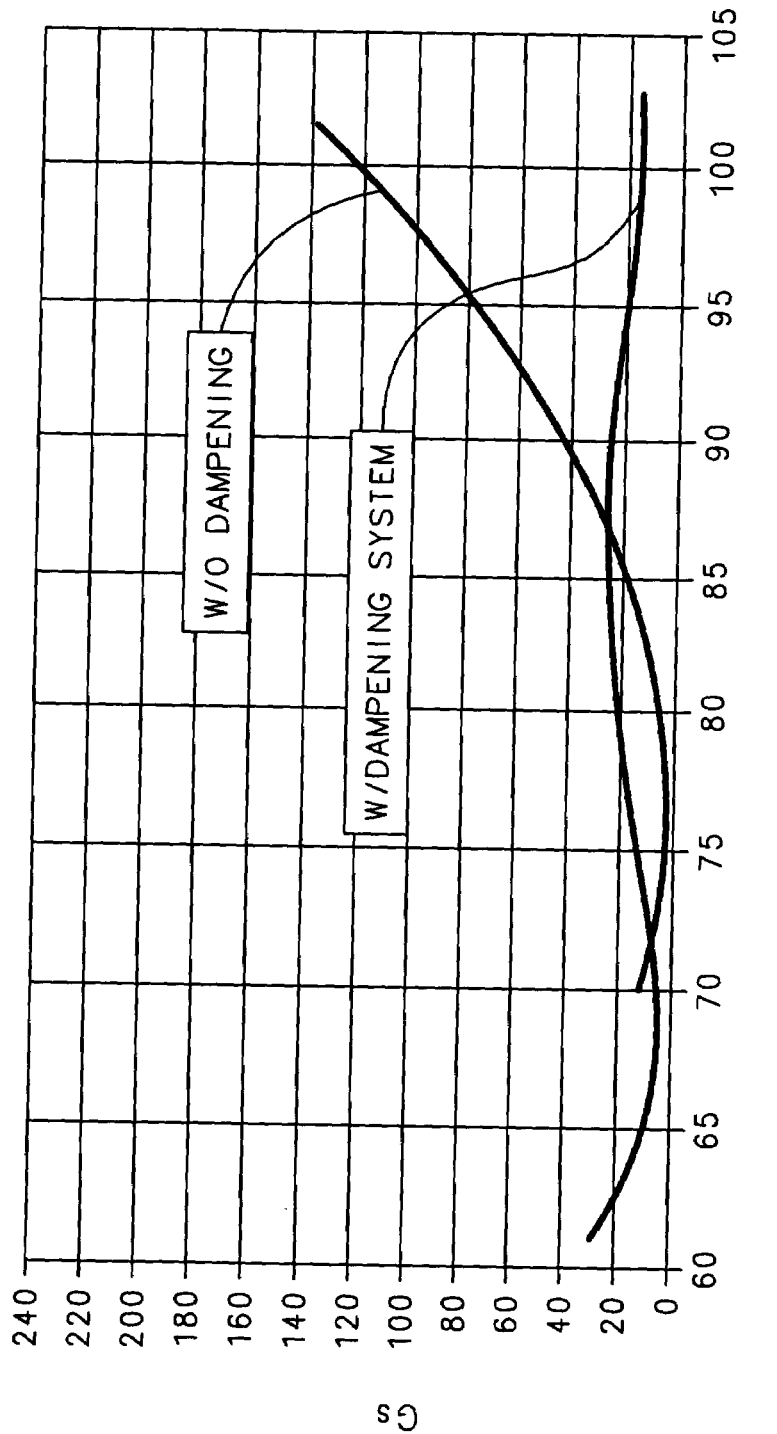
FIG. 4 is a graphical representation of the reduction in high first engine order ($1^{st}$ EO) vibration characteristics achieved by a dampening system according to the present invention.

Preferably, each dampening system 46 includes one or more grooves 48 within the housing 14 which receives a resilient member 50 such as O-rings and/or elastomeric strips. It should be understood that other elastomeric, non-metallic, plastic, teflon, composite or other spring type resilient members will benefit from the present invention. The resilient members 50 provide for vibration absorption or dampening of the shaft 16 $1^{st}$ EO characteristics (FIG. 4).

Alternatively or in addition, an annular sleeve 52 includes the grooves 48 and the resilient member 50. The annular sleeve 52 is particularly preferred to provide a single mounting surface for a forward bearing 18 which is often located at an interface I between multiple engine housing portions such as the housing 14 and a forward inlet cap 54. The annular sleeve 52 thereby bridges the interface I to provide a stable and consistent mounting location for the bearing 18.

Figure 5:
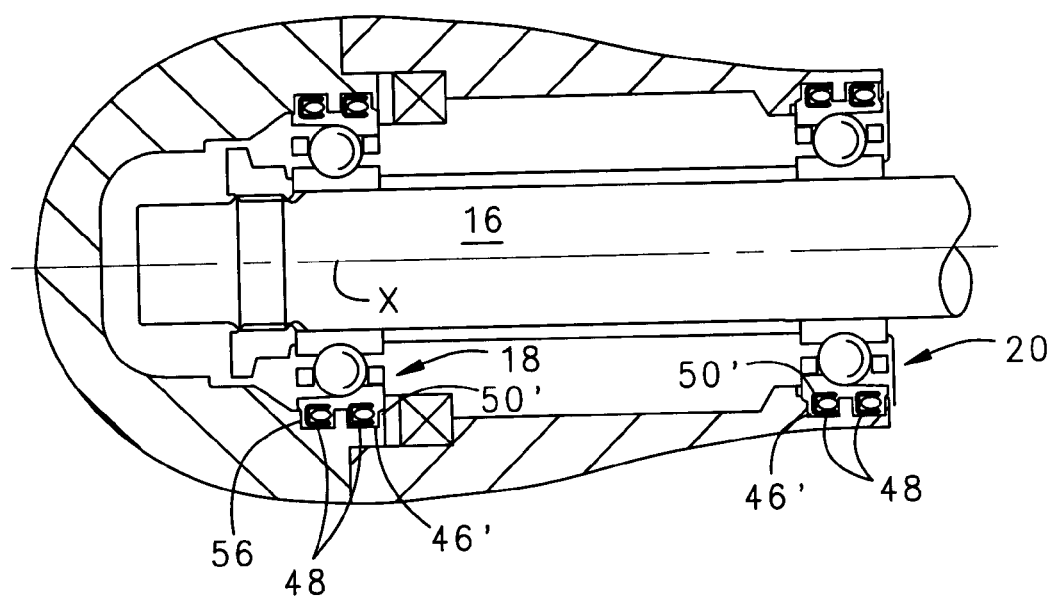
FIG. 5 is an expanded view of another dampening system.

Referring to FIG. 5, the forward and aft bearings 18, 20 are preferably in contact with another dampening system 46' located between each bearing 18,20 and the housing 14 or other static structure. That is, the bearings 18, 20 are closely mounted within a bore 49 in the housing 14 but are supported upon the dampening system 46'. It should be understood that other bearing mounting static structure will also benefit from the present invention.

Preferably, each dampening system 46' includes one or more grooves 48' within the housing 14 which receives a resilient member 50' such as a rotary seal 56 such as the rotary seal manufactured by BAL SEAL ENGINEERING COMPANY INC., of Foothill Ranch, Calif. The rotary seal 56 generally includes a non-organic plastic C-seal 58 with an at least partially encapsulated stainless steel spring 60 (also illustrated in FIG. 6). The resilient members 50' likewise provide for vibration absorption or dampening of the shaft 16 $1^{st}$ EO characteristics (FIG. 4) but with a long term storage capability.

Figure 6:
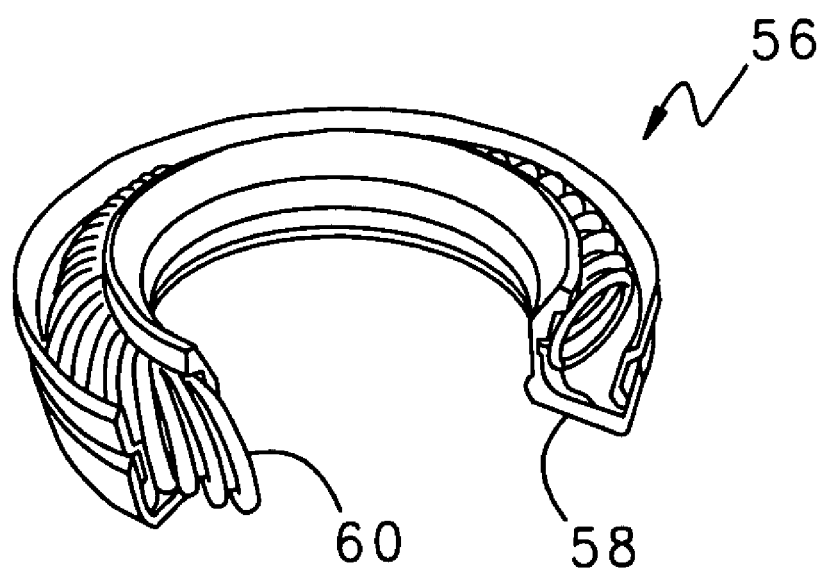
FIG. 6 is an expanded perspective view of a resilient member of FIG. 5.

Referring to FIG. 6, the coils of the stainless steel spring 60 are canted within the plastic C-seal 58. The canted coils provide a near-constant load even after normal seal wear and despite changes in temperature or variation in compression. Dependable seal operation and reliability is thereby provided irrespective of long term storage. Such a long term reliability is particularly appropriate for the life of the for a vehicle 100 (FIG. 1) which may be subjected to long term storage of an unknown period prior to usage.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A dampening system for a miniature gas turbine engine comprising:
   a resilient member mounted between a bearing and a static structure of the gas turbine, said resilient member comprising a seal with an at least partially encapsulated spring.

2. The dampening system as recited in claim 1, wherein said seal comprises a resilient C-shaped member in cross-section.

3. The dampening system as recited in claim 1, wherein a coil of said spring is canted.

4. The dampening system as recited in claim 1, wherein said resilient member is mounted within a groove formed within said static structure.

5. The dampening system as recited in claim 4, wherein said groove is formed within a sleeve mounted adjacent said static structure.

6. The dampening system as recited in claim 4, wherein said groove is formed within a sleeve mounted adjacent said static structure and a second housing portion.

7. A rotor system for a miniature gas turbine engine comprising:
   an engine housing portion having a groove;
   a resilient member mounted within said groove, said resilient member comprising a seal with an at least partially encapsulated spring;
   a bearing mounted adjacent said resilient member;
   a shaft rotationally mounted within said bearing.

8. The rotor system as recited in claim 7, wherein said seal comprises a resilient C-shaped member in cross-section.

9. The rotor system as recited in claim 7, wherein a coil of said spring is canted.

* * * * *